3,322,765
2,4-DIAMINO-6-BENZYLPYRIDO-(2,3-d) PYRIMIDINES AND METHOD
George H. Hitchings, Yonkers, and Bernard S. Hurlbert, Tarrytown, N.Y., assignors to Burroughs Wellcome & Co. (U.S.A.) Inc., Tuckahoe, N.Y., a corporation of New York
No Drawing. Filed Oct. 28, 1964, Ser. No. 407,230
Claims priority, application Great Britain, Jan. 8, 1964, 808/64
6 Claims. (Cl. 260—256.4)

This application is a continuation-in-part of applications Ser. No. 319,984, filed Oct. 30, 1963, now abandoned, and Ser. No. 358,657, filed Apr. 9, 1964. Patent application Ser. No. 358,657, mentioned above, is itself a continuation-in-part of Ser. No. 207,798, filed July 5, 1962, and now abandoned.

The subject of this invention is a family of 2,4-diamino-6-benzylpyrido(2,3-d)pyrimidines represented by Formula I.

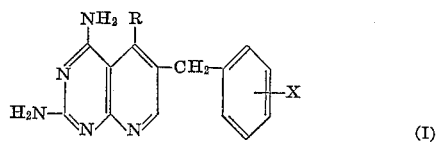

wherein R is a methyl or hydrogen and X is selected from the class consisting of halogen, lower alkyl, lower alkoxy, nitro, amino and hydrogen.

The members of the family in which R is methyl are prepared by route (a)

(a)

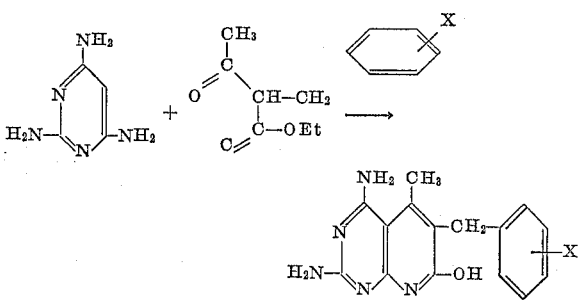

The 7-hydroxyl group of II is then replaced by sulfhydryl and that in turn by hydrogen (through the action of Raney nickel). Alternatively, the 7-hydroxyl may be replaced by chlorine and then by hydrogen through reductive procedures. This route is essentially that of our U.S. Patent 2,937,284. The compounds in which R is hydrogen are prepared by the method of our copending application No. 358,657, Oct. 26, 1964.

In U.S. Patent 2,937,284, it was shown that 2,4-diamino-5,6-dialkylpyrido(2,3-d)pyrimidines were bactericides of greater activity than corresponding 6,7-dialkyl analogues previously known.

It has now been found that the 6-benzyl compounds of Formula I share the activity of the 5,6-dialkyl compounds but quite unexpectedly have markedly lower toxicity. Since all the compounds of this type act mainly as inhibitors of dihydrofolic reductases and it is known that marked differences in inhibitory levels are found for such enzymes of differing origin, it is probable that the differences in toxicity are due to the compounds of the present invention being weaker as inhibitors of the mammalian reductases.

These compounds are bases and are usually administered as salts of non-toxic acids such as hydrochloric, sulfuric, ethionic acid or the like.

EXAMPLE 1

2,4-diamino-6-benzyl-7-hydroxy-5-methylpyrido (2,3-d)-pyrimidine

In a 2-liter flask equipped with a stirrer, thermometer in the reaction mixture, and still head was placed 2.05 mole (257 g.) of 2,4,6-triaminopyrimidine, 2.05 mole (450 g.) of ethyl α-benzylacetoacetate and 1600 ml. of diphenyl ether. The flask was heated, with stirring, at 215–235° until distillation of ethanol and water subsided. The reaction mixture was cooled to room temperature and an equal volume of hexane added. The mixture was filtered and washed with hexane. The precipitate was slurried in one liter of water at 90–100°, filtered while hot and washed with methanol. M.P. 300° (dec.), yield=332 g. (58 percent); ultraviolet absorption spectra (10 mg./l., 1 cm.); pH 1: maximum 321 mμ; optical density, 0.480 and pH 11: maximum 327 mμ; optical density, 0.305.

EXAMPLE 2

2,4-diamino-6-benzyl-7-mercapto-5-methylpyrido (2,3-d)-pyrimidine

A mixture of 307 g. (1.09 mole) of 2,4-diamino-6-benzyl-7-hydroxy-5-methylpyrido(2,3-d)pyrimidine and 300 g. of phosphorus pentasulphide in 2400 ml. of pyridine was boiled under reflux for one hour. Most of the pyridine was distilled off under reduced pressure and three liters of water was added to the residue. This mixture was heated to 80–90° and brought to pH 5 with hydrochloric acid while stirring vigorously. The mixture was filtered while hot and washed with two liters of hot water. The precipitate was slurried again in five liters of hot water, filtered and washed with hot water. Yield=432 g. This material was used in the subsequent reaction without further purification.

EXAMPLE 3

2,4-diamino-6-benzyl-5-methylpyrido(2,3-d)pyrimidine

In a two-liter flask equipped with a stirrer and reflux condenser was placed 20 g. (0.05 mole) of the 2,4-diamino-6-benzyl-7-mercapto - 5 - methylpyrido(2,3-d)pyrimidine prepared in Example 2, one liter of SD3A alcohol (95 percent ethanol plus 5 percent methanol) and 100 ml. of 29 percent aqueous ammonia. The mixture was stirred and heated to boiling and small amounts of No. 28 Active Raney Nickel Catalyst (Raney Catalyst Co., Inc., Chattanooga, Tenn., U.S.A.) were added at twenty minute intervals. The reaction was followed by the ultraviolet absorbance of aliquots of the reaction mixture dissolved in 0.1 N hydrochloric acid. The reaction was considered to be complete when the ratio of optical densities 322 mμ/395 mμ was greater than three. The reaction mixture was then filtered through a bed of mixed charcoal and Super-Cel, washed with hot ethanol and the filtrate concentrated in vacuo to 200 ml. The precipitate which formed on cooling and standing was filtered and dried. Yield=4–4.5 g. The yield (42.5 g.) of ten such runs and 14 g. from other runs were combined (56.5 g. total) and purified by dissolving in four liters of 70 percent SD3A alcohol-30 percent water made acid to pH 3–4 by hydrochloric acid. This solution was filtered through a charcoal-Super-Cel bed and concentrated in vacuo on a steam bath until a haze appeared. It was chilled and the precipitate filtered and dried. Yield=43 g. Ultraviolet absorption spectra (10 mg./l., 1 cm.) pH 1: maxima 232 mμ (optical density, 1.26); 322 mμ (O.D., 0.29) shoulders at 270 mμ (O.D., 0.25); 330 mμ (O.D., 0.27). pH 11: maxima 238 mμ (O.D., 1.08); 270 mμ (O.D., 0.39); 347 mμ (O.D., 0.24).

EXAMPLE 4

*2,4-diamino-7-hydroxy-5-methyl-6-(p-methylbenzyl) pyrido-(2,3-d)pyrimidine*

Using the procedure described in Example 1, 2,4-diamino - 7 - hydroxy - 5 - methyl-6-(p-methylbenzyl)pyrido (2,3-d)pyrimidine was prepared from 133.3 g. (0.570 mole) of ethyl α-(p-methylbenzyl)acetoacetate and 71.2 g. (0.570 mole) of 2,4,6-triaminopyrimidine in 400 ml. of diphenyl ether. Yield=93.8 g. (56 percent). Ultraviolet absorption spectrum pH 1: maxima 220 m$\mu$, 320 m$\mu$; O.D. ratio 220 m$\mu$; 320 m$\mu$; 1:0.53.

EXAMPLE 5

*2,4-diamino-7-chloro-5-methyl-6-(p-methylbenzyl) pyrido-(2,3-d)pyrimidine*

In a one-liter flask fitted with a stirrer and reflux condenser was placed 29.53 g. (0.10 mole) of 2,4-diamino-7-hydroxy - 5 - methyl-6-(p-methylbenzyl)pyrido(2,3-d)-pyrimidine, 73.0 g. (1.0 mole) of N,N-dimethylformamide and 200 ml. of chloroform. The mixture was stirred and 119 g. (1.0 mole) of thionyl chloride was added slowly. It was then boiled for three hours, solution occurring after one-half hour. This solution was concentrated in vacuo to a viscous liquid and cooled. Sufficient 95 percent ethanol was added to make the liquid mobile and 29 percent aqueous ammonia was added dropwise, with vigorous stirring and keeping the temperature below 20° C., until a pH value of 9 was reached. This mixture was allowed to stand 18 hours at 0–10° C. The mixture was then filtered and the precipitate was stirred with 400 ml. of 2 N sodium hydroxide for three hours at room temperature. This mixture was filtered and washed with water to yield 23.2 g. of product. This material is unstable, particularly in acid solutions and was not further purified. Ultraviolet absorption spectra, pH 1: maxima 223 m$\mu$, 231 m$\mu$, 359 m$\mu$; optical density ratios 1:1:0.44; and pH 11: maxima 237 m$\mu$, 366 m$\mu$; O.D. ratio 1:0.38.

EXAMPLE 6

*2,4-diamino-7-mercapto-5-methyl-6-(p-methylbenzyl) pyrido-(2,3-d)pyrimidine*

A saturated solution of ammonium hydrosulphide was prepared by passing hydrogen sulphide gas into a cold solution of 9 percent aqueous ammonia. 18.3 g. (0.058 mole) of 2,4 - diamino - 7 - chloro-5-methyl-6-(p-methylbenzyl)pyrido-(2,3-d)pyrimidine and 200 ml. of the above solution were placed in a stainless steel bomb and heated at 130° for 6 hours. After cooling, the contents of the bomb were filtered to yield 10.5 g. (58 percent) of crude product. This was not purified. Ultraviolet absorption spectrum: pH 1: maximum 388 m$\mu$.

EXAMPLE 7

*2,4-diamino-5-methyl-6-(p-methylbenzyl)pyrido(2,3-d)-pyrimidine*

Using the procedure described in Example 3, 10.5 g. of 2,4-diamino-7-mercapto - 5 - methyl - 6 - (p - methylbenzyl)pyrido(2,3-d)pyrimidine was dethiolated to yield 2.65 g. of crude base. This was recrystallized from 200 ml. of 70 percent aqueous ethanol which was made acid to pH 3–4 by hydrochloric acid. 2.08 g. (18 percent) of hydrochloride salt hydrate was obtained. Ultraviolet absorption spectra (10 mg./l., 1 cm.) pH 1: maxima 230 m$\mu$ (optical density 0.955); 322 m$\mu$ (O.D. 0.225); shoulder 265 m$\mu$ (O.D. 0.372); pH 11: maxima 233 m$\mu$ (O.D. 0.885) 344 m$\mu$ (O.D. 0.200), shoulder 265–274 m$\mu$ (O.D. 0.258).

EXAMPLE 8

*2,4-diamino-6-(p-chlorobenzyl)-7-hydroxy-5-methyl-pyrido-(2,3-d)pyrimidine*

Using the procedure described in Example 1, 41.2 g. (44 percent) of the title compound was prepared from 75 g. (0.294 mole) of ethyl α-(p-chlorobenzyl)acetoacetate and 36.8 g. (0.294 mole) of 2,4,6-triaminopyrimidine in 150 ml. of diphenyl ether. Ultraviolet absorption spectra (40 ml./l., 1 cm.) pH 1: maxima 222 m$\mu$ (O.D. 1.38); 318 m$\mu$ (O.D. 0.518); shoulder 297 m$\mu$ (O.D. 0.472); pH 11: maxima 231 m$\mu$ (O.D. 0.644), 286 m$\mu$ (O.D. 0.235), 325 m$\mu$ (O.D. 0.390).

EXAMPLE 9

*2,4-diamino-7-chloro-6-(p-chlorobenzyl)-5-methyl-pyrido(2,3-d)pyrimidine*

As described in Example 5, 63.14 g. (0.20 mole) of 2,4 - diamino - 6 - (p-chlorobenzyl)-7-hydroxy-5-methyl-pyrido(2,3-d)-pyrimidine, 146 g. (2.0 mole) of N,N-dimethylformamide, 400 ml. of chloroform and 238 g. (2.0 mole) of thionyl chloride were mixed and boiled 5½ hours. The solution was concentrated in vacuo at 50° and poured into 400 ml. of chilled 95 percent ethanol. This solution was treated with aqueous ammonia as in Example 5 and allowed to stand at 0° C. for five days. The mixture was filtered, washed with one liter of 50 percent ethanol, and dried to give 96.0 g. of solid material which was thiolated without further purification. Ultraviolet absorption spectra: pH 1: 221 m$\mu$, 332 m$\mu$ (O.D. ratio 1:0.35); pH 11: 357 m$\mu$.

EXAMPLE 10

*2,4-diamino-6-(p-chlorobenzyl)-7-mercapto-5-methyl-pyrido-(2,3-d)pyrimidine*

As described in Example 6, 27.0 g. of the title compound was obtained by thiolation of 50.0 g. of the 7-chloro compound obtained in Example 9. Ultraviolet absorption spectra: pH 1: maximum 385 m$\mu$; pH 11: maximum 231 m$\mu$ and 373 m$\mu$ (O.D. ratio 1:0.44).

EXAMPLE 11

*2,4-diamino-6-(p-chlorobenzyl)-5-methylpyrido(2,3-d)-pyrimidine*

As described in Example 3, 27.0 g. of the 7-mercapto compound of Example 10 was dethiolated with Raney nickel catalyst to yield 3.87 g. of product as the hemihydrate, a yield of 12 percent from the 7-hydroxy compound, M.P. 275–7° (uncorrected). Ultraviolet spectra (10 mg./l., 1 cm.) pH 1: maxima 230 m$\mu$ (O.D. 1.07); 322 m$\mu$ (O.D. 0.244); pH 11: maxima 232 m$\mu$ (O.D. 0.972); 344 m$\mu$ (O.D. 0.195).

EXAMPLE 12

*2,4-diamino-6-(o-chlorobenzyl)-5-methylpyrido(2,3-d)-pyrimidine*

As described in Example 1, 119 g. (51 percent) of 2,4-diamino - 6 - (o - chlorobenzyl) - 7 - hydroxy - 5 - methylpyrido(2,3-d)-pyrimidine was prepared from 187.8 g. (0.74 mole) of ethyl α-(o-chlorobenzyl)acetoacetate and 92.6 g. (0.74 mole) of 2,4,6-triaminopyrimidine. 50 g. (0.158 mole) of this 7-hydroxy compound was thiolated as described in Example 2 to yield 52.7 g. (100 percent) of crude 2,4 - diamino - 6 - (o - chlorobenzyl) - 7 - mercapto - 5 - methylpyrido(2,3 - d)pyrimidine. 25 g. of this crude 7-mercapto compound was dethiolated as in Example 3 to yield a product which was recrystallized from 80 percent ethanol which had been acidified to pH 3 with isethionic acid. 2.30 g. (7.2 percent) of 2,4-diamino-6-(o - chlorobenzyl) - 5 - methylpyrido(2,3 - d)pyrimidine isethionate salt was obtained. M.P. 208.5 (uncorrected). Ultraviolet absorption spectra (10 mg./l., 1 cm.) pH 1: maxima 231 m$\mu$ (O.D. 0.868); 320 m$\mu$ (O.D. 0.187); pH 11: maxima 238 m$\mu$ (O.D. 0.742); 344 m$\mu$ (O.D. 0.155).

EXAMPLE 13

*2,4-diamino-7-hydroxy-6-(o-methoxybenzyl)-5-methylpyrido-(2,3-d)-pyrimidine*

As described in Example 1, 105.2 g. (49 percent) of the title compound was prepared from 174.5 g. (0.70 mole) of ethyl α-(o-methoxybenzyl)acetoacetate and 87.5 g. (0.70 mole) of 2,4,6-triaminopyrimidine. Ultraviolet absorption spectra (30 mg./l., 1 cm.). pH 1: maxima 222 mμ (O.D. 0.685); 320 mμ (O.D. 0.330); pH 11: maxima 233 mμ (O.D. 0.372); 287 mμ (O.D. 0.182); 324 mμ (O.D. 0.356).

EXAMPLE 14

*2,4-diamino-6-(o-methoxybenzyl)-5-methylpyrido(2,3-d) pyrimidine*

As described in Example 2, 51.9 g. (100 percent) of the 7-mercapto compound was obtained by thiolation of 50 g. (0.161 mole) of 2,4-diamino-7-hydroxy-6-(o-methoxybenzyl)-5-methylpyrido(2,3-d)pyrimidine. Ultraviolet absorption maximum at 397 mμ in pH 1 solution. 25 g. (0.076 mole) of this 7-mercapto compound was dethiolated as described in Example 3 to yield 4.40 g. (17 percent) of 2,4-diamino-6-(o-methoxybenzyl)-5-methylpyrido(2,3-d)pyrimidine hydrochloride hemihydrate after recrystallization from 70 percent ethanol acidified to pH 2 with hydrochloric acid. Ultraviolet absorption spectra (10 mg./l., 1 cm.) pH 1: maxima 218 mμ (O.D. 0.990); 320 mμ (O.D. 0.250), shoulder 255 mμ (O.D. 0.240); pH 11: maxima 224 mμ (O.D. 0.780); 260 mμ (O.D. 0.322); 340 mμ (O.D. 0.187).

EXAMPLE 15

*2,4-diamino-7-hydroxy-6-(p-methoxybenzyl)-5-methylpyrido-(2,3-d)-pyrimidine*

As described in Example 1, 108.5 g. (53 percent of the title compound was prepared from 165.6 g. (0.656 mole) of ethyl α-(p-methoxybenzyl)acetoacetate and 82.3 g. (0.656 mole) of 2,4,6-triaminopyrimidine in 500 ml. of diphenyl ether. Ultraviolet absorption spectra (10 mg./l., 1 cm.) pH 1: maxima 222 mμ (O.D. 1.175); 321 mμ (O.D. 0.604), shoulder 295 mμ (O.D. 0.494); pH 11: maxima 229 mμ (O.D. 0.673); 281 mμ (O.D. 0.247); 327 mμ (O.D. 0.518).

EXAMPLE 16

*2,4-diamino-6-(p-methoxybenzyl)-5-methylpyrido-(2,3-d)-pyrimidine*

As described in Example 2, 29.5 g. (95 percent) of the 7-mercapto compound was obtained by thiolation of 29.7 g. (0.096 mole) of 2,4-diamino-7-hydroxy-6-(p-methoxybenzyl)-5-methylpyrido(2,3-d)pyrimidine. Ultraviolet absorption spectra (10 mg./l., 1 cm.) pH 1: maxima 222 mμ (O.D. 0.915); 317 mμ (O.D. 0.272); 400 mμ (O.D. 0.330); pH 11: maxima 230 mμ (O.D. 0.959); 333 mμ (O.D. 0.215); 372 mμ (O.D. 0.304). 25 g. (0.076 mole) of this 7-mercapto compound was dethiolated as described in Example 3 to yield 2.82 g. (11 percent of theory) of 2,4 - diamino - 6 - (p - methoxybenzyl) - 5 - methylpyrido-(2,3-d)pyrimidine hydrochloride after recrystallization from 50 percent ethanol acidified with hydrochloric acid. Ultraviolet absorption spectra (10 mg./l., 1 cm.) pH 1: maxima 232 mμ (O.D. 1.142); 322 mμ (O.D. 0.245); pH 11: maxima 236 mμ (O.D. 1.036); 270 mμ (O.D. 0.410); 347 mμ (0.193).

EXAMPLE 17

*2,4-diamino-6-(p-methylbenzyl)pyrido(2,3-d)-pyrimidine*

4.4 g. (0.044 mole) of phosgene in 25 ml. of chloroform was added slowly with cooling in an ice bath to a solution of 9.0 g. (0.044 mole) of 3-dimethylamino-2-(p-methylbenzyl)-acrolein in 25 ml. chloroform. The solution was concentrated in vacuo on a steam bath until most of the chloroform was removed. 5.53 g. (0.044 mole) of 2,4,6-triaminopyrimidine and 125 ml. of absolute ethanol were added and the mixture heated under reflux for 8 hours. 2 grams of sodium methoxide was added and the mixture heated under reflux a further 2 hours. It was then cooled and filtered and the precipitate was stirred for 3 hours with 200 ml. of 2 N sodium hydroxide. The mixture was filtered and the precipitate was recrystallized from 100 mls. of 95 percent ethanol which was acidified with isethionic acid to give the basic isethionate salt. M.P. 286–9° (uncorr.) yield 2.04 g. (14 percent). Ultraviolet absorption spectra (10 mg./l., 1 cm.) pH 1: maxima 222 mμ (O.D. 1.070); 322 mμ (O.D. 0.260); pH 11: maxima 248 mμ (O.D. 0.798); 269 mμ (O.D. 0.410); 347 mμ (O.D. 0.220).

EXAMPLE 18

2,4 - diamino - 6 - benzylpyrido(2,3 - d)pyrimidine was prepared by the method of Example 17.

EXAMPLE 19

*2,4-diamino-6-(p-chlorobenzyl)pyrido(2,3-d) pyrimidine*

As described in Example 17, the title compound was prepared from 4.47 g. (0.02 mole) of 2-(p-chlorobenzyl)-3-dimethylaminoacrolein, 2 g. (0.02 mole) of phosgene and 2.5 g. (0.02 mole) of 2,4,6-triaminopyrimidine. It was recrystallized from 70 percent ethanol acidified with hydrochloric acid to yield 500 mg. (7.8 percent of theory) of hydrochloride salt. Ultraviolet absorption spectra (10 mg./l., 1 cm.) pH 1: maxima 225 mμ (O.D. 1.244); 321 mμ (O.D. 0.303); pH 11: maxima 249 mμ (O.D. 0.796); 270 mμ (O.D. 0.420); 352 mμ (O.D. 0.226).

EXAMPLE 20

*2,4-diamino-6-(p-methoxybenzyl)pyrido(2,3-d) pyrimidine*

As described in Example 17, the title compound was prepared from 6.48 g. (0.0295 mole) of 2-(p-methoxybenzyl)-3-dimethylaminoacrolein, 2.92 g. (0.0295 mole) of phosgene and 3.69 g. (0.0295 mole) of 2,4,6-triaminopyrimidine. It was recrystallized from 95 percent ethanol acidified with isethionic acid to yield 1.21 g. (12 percent of theory) of the basic isethionate salt hydrate. M.P. 280–5° (uncorr.). Ultraviolet absorption spectra (10 mg./l., 1 cm.) pH 1: maxima 323 mμ (O.D. 0.239); pH 11: maxima 249 mμ (O.D. 0.682); 291 mμ (O.D. 0.394); 349 mμ (O.D. 0.202).

EXAMPLE 21

*2,4-diamino-6-(p-nitrobenzyl)pyrido(2,3-d)pyrimidine*

3.0 g. (0.01 mole) of 2,4-diamino-6-benzylpyrido(2,3-d)-pyrimidine hydrochloride was dissolved in 50 ml. of concentrated sulphuric acid at 0° C. and 1.0 g. (0.01 mole) of potassium nitrate was added with stirring. The solution was stirred 1.5 hours and then poured into 400 ml. of ice and ethanol. This mixture was adjusted to a pH value of 3 with 17 N sodium hydroxide and filtered. The precipitate was recrystallized from 800 ml. of 70 percent ethanol to give 2.0 g. (51 percent of theory) of 2,4 - diamino - 6 - (p - nitrobenzyl)pyrido(2,3 - d)pyrimidine sulphate salt hydrate, M.P. 276–7°. Ultraviolet absorption spectra (10 ml./l., 1 cm.) pH 1: maxima 271 mμ (O.D. 4.439); 322 mμ (O.D. 0.334); pH 11: maxima 251 mμ (O.D. 0.415); 272 mμ (O.D. 0.341); 347 mμ (O.D. 0.156).

What we claim is:
1. A compound represented by the formula

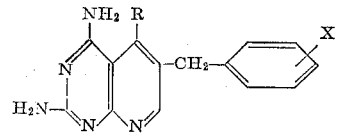

wherein R is selected from the class consisting of hydrogen and methyl and X is selected from the class consisting of hydrogen, halogen, lower alkyl, lower alkoxy, nitro and amino.

2. 2,4 - diamino - 5 - methyl - 6 - benzylpyrido(2,3 - d)-pyrimidine.

3. 2,4 - diamino - 5 - methyl - 6 - benzylpyrido(2,3 - d)-pyrimidine ethionate.

4. 2,4 - diamino - 6 - benzylpyrido(2,3 - d)-pyrimidine.

5. 2,4 - diamino - 6 - benzylpyrido(2,3 - d)-pyrimidine ethionate.

6. 2,4 - diamino - 5 - methyl - 6 - o - chlorobenzylpyrido(2,3-d)pyrimidine.

References Cited

FOREIGN PATENTS

| 774,095 | 5/1957 | Great Britain. |
| 620,374 | 1/1963 | Belgium. |

ALEX MAZEL, *Primary Examiner.*

MARY O'BRIEN, *Assistant Examiner.*